United States Patent [19]

Lin

[11] 4,379,728

[45] Apr. 12, 1983

[54] CYANOUREA COMPOUNDS OR POLYMERS THEREOF AS EPOXY RESIN CURING AGENTS

[75] Inventor: Shiow C. Lin, Columbia, Md.

[73] Assignee: W. R. Grace & Co., New York, N.Y.

[21] Appl. No.: 345,948

[22] Filed: Feb. 4, 1982

[51] Int. Cl.³ .............................................. C08G 59/44
[52] U.S. Cl. .................................. 156/307.3; 156/330;
525/113; 525/122; 525/504; 528/28; 528/98;
528/100; 528/119; 528/123; 528/354; 528/361;
528/367
[58] Field of Search ............... 525/504, 113, 122, 333,
525/334; 528/98, 100, 28, 119, 123, 354, 361,
525/367; 156/330, 307.3

[56] References Cited

U.S. PATENT DOCUMENTS

| | | | |
|---|---|---|---|
| 3,956,237 | 5/1976 | Doorakian et al. | 528/119 X |
| 4,110,309 | 8/1978 | Schulze et al. | 528/119 |
| 4,168,364 | 9/1979 | Seltzer et al. | 528/367 X |
| 4,178,427 | 12/1979 | Waddill et al. | 528/367 X |
| 4,187,367 | 2/1980 | Waddill | 528/367 X |

*Primary Examiner*—Earl A. Nielsen

*Attorney, Agent, or Firm*—Richard P. Plunkett; William W. McDowell, Jr.

[57] ABSTRACT

This invention is directed to latent thermal curing agents for epoxy resins comprising cyanourea compounds of the formula:

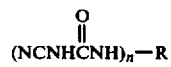

wherein R is the organic moiety of a mono- or polyisocyanate remaining after reaction of the isocyanate group or groups to form cyanourea groups and n is 1 or more, preferably 1 to 2. The epoxy-curing agent system is stable at room temperature and cures at temperatures above 100° C. to form a crosslinked, solid material suitable as an adhesive, sealant or coating. The polymeric form polymerized from dicyanourea compound can be dissolved in a solvent and admixed with an epoxy resin to form a thermoset adhesive, sealant or coating on heating above 100° C. The polymeric form from the combination of cyanourea and dicyanourea or dicyanourea per se dissolving in epoxy resin also forms a thermosetting adhesive, sealant or coating on heating above 100° C.

18 Claims, 1 Drawing Figure

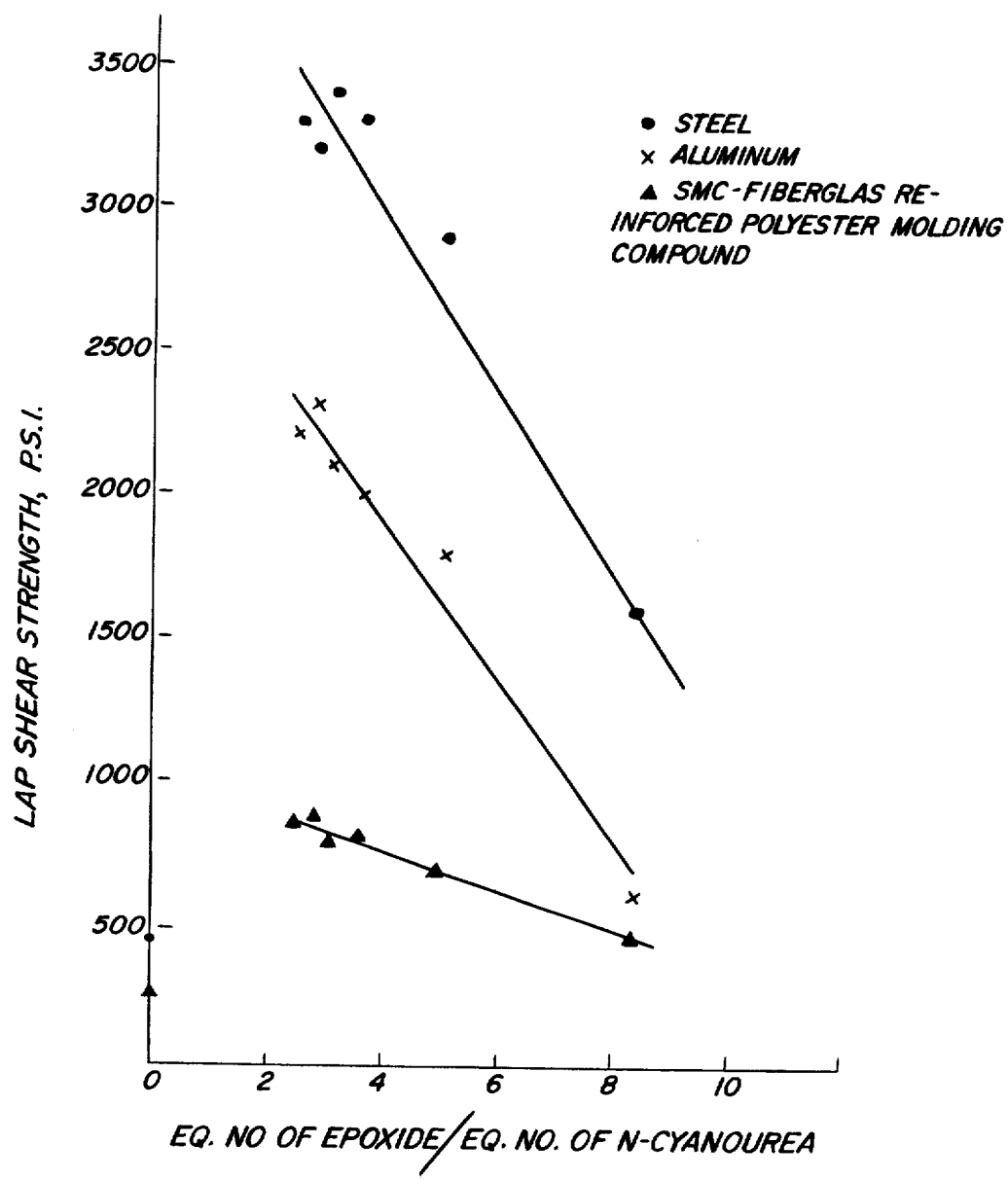

CYANOUREA COMPOUNDS OR POLYMERS THEREOF AS EPOXY RESIN CURING AGENTS

BACKGROUND OF THE INVENTION

1. Field of the Invention

This invention relates to a novel epoxy resin curing system. The invention also is directed to cyanourea compounds in both monomeric and polymeric form which can be used as latent curing agents for epoxy resins. Additionally, the invention relates to formation of thermoset materials from epoxy resin-cyanourea compound formulations which can be used as one component adhesives sealants or coatings. This invention further relates to a process employing a novel curing agent in combination with an epoxy resin which, on application of heat, preferably in an accelerated manner, crosslinks to give a thermoset bond, seal or coating.

2. Description of the Prior Art

Conventional hot melt adhesive compositions are thermoplastic bonding materials which are solid at room temperature but become soft and fluid with good wettability of the adherent at elevated temperatures. These adhesives are readily applied in the molten state between adherends resulting in a strong adhesive thermoplastic bond on cooling and hardening.

Thermoplastic adhesives, which are used in the form of solutions, dispersions or solids, usually bond by purely physical means. Probably the most important means of applying thermoplastic adhesives is the hot melt method wherein bond formation occurs when the polymer melt solidifies in position between adherends. The bonds obtained by this method reach their final strength faster than those obtained from solution type adhesives. Obviously, the thermal stability of the thermoplastic resin determines its potential usefulness as a hot melt adhesive. In order for the thermoplastic to be used as a hot melt, it must also have a low melt viscosity, thus permitting application of the adhesive to the adherends at acceptable rates. Usually this means the polymer must have a low molecular weight. However, many thermoplastic materials cannot be employed as hot melts because they do not have sufficient cohesive strength at the low molecular weights required for application to a substrate. For example, the low molecular weight polyolefins, especially low molecular weight, low density polyethylene, are widely used in hot melt adhesives for sealing corrugated cartons, multy-wall bag seaming and the like, but they do not have sufficient strength to be used in structural applications such as plywood manufacture. Further, they do not have sufficient heat resistance to be used for bonding components which are intermittently exposed to elevated temperatures such as under the hood automotive applications. That is, thermoplastic adhesives cannot be employed where the adhesive in situ is reexposed to elevated temperatures which will cause the adhesive to sag thereby allowing the bond to break.

The concept of thermosetting or crosslinking resin adhesive is also known in the art. Many resin adhesives which undergo an irreversible, chemical and physical change and become substantially insoluble are known. Thermosetting adhesives comprising both condensation polymers and addition polymers are also known and examples include the urea-formaldehyde, phenol-formaldehyde and melamine-formaldehyde adhesives; epoxy, unsaturated polyester and polyurethane adhesives. More particularly, U.S. Pat. No. 3,723,568 teaches the use of polyepoxides and optional epoxy polymerization catalysts. U.S. Pat. No. 4,122,073 teaches thermosetting resin obtained from polyisocyanates, polyanhydrides and polyepoxides. Crosslinking in these patents is achieved by reaction with available sites in the base polymers. U.S. Pat. No. 4,137,364 teaches crosslinking of an ethylene/vinyl acetate/vinyl alcohol terpolymer using isophthaloyl, bis-caprolactam or vinyl triethoxy silane whereby crosslinking is achieved before heat activation with additional crosslinking induced by heat after application of the adhesive. U.S. Pat. No. 4,116,937 teaches a further method of thermal crosslinking by the use of polyamino bis-maleimide class of flexible polyimides, which compounds can be hot melt extruded up to 150° C. and undergo crosslinking at elevated temperatures thereabove. In these latter two patents, thermal crosslinking is also achieved by reactions of the particular crosslinking agent with available sites of the base polymers. U.S. Pat. No. 3,934,056 teaches resin compositions of high adhesivity comprising ethylene-vinyl acetate copolymer, chlorinated or chlorosulfonated polyethylene, unsaturated carboxylic acids and an organic peroxide. Another thermosetting adhesive is known from U.S. Pat. No. 3,945,877 wherein the composition comprises a coal tar pitch, ethylene/vinyl acetate copolymer and ethylene/acrylic acid copolymer plus a crosslinking agent such as dicumyl peroxide.

In many of these prior art thermosetting adhesive compositions admixture of 2, 3 or 4 components is necessary in order to get a thermoset bond. Thus, the resultant bond depends on the homogeneity of the admixture. Further, in many cases, e.g., epoxy adhesives, two or more components must be admixed just prior to the preparation of the bond. This necessitates a fast application since the crosslinking reaction begins immediately upon admixture and is irreversible.

It is known to form 1-cyano-3-phenylurea. This product has a melting point in the range 122°–126° C. whereat it decomposes and fails to form a clear melt during the decomposition. See Organic Synthesis IV, pp. 113–217, J. Wiley & Sons, Inc., 1963. No use is known for this compound.

It is also known to cure epoxy resins with dicyandiamide. However, such a curing agent is foreign to those taught herein.

OBJECTS OF THE INVENTION

One object of the instant invention is to produce a composition, usable as an adhesive, sealant or coating which is solventless. Another object of the invention is to produce a composition which can be applied as a hot melt as well as a pumpable system. Still another object of the instant invention is to produce a composition which is heat curable in a minimum time period. Yet another object is to provide a storage stable, one component,epoxy containing adhesive, sealant or coating curable to a thermoset material on heating. A further object of the invention is to produce a novel curing agent which in combination with an epoxy resin will result in a thermoset coating, adhesive or sealant on heating. Yet another object of the invention is to produce a thermoplastic composition which can be applied as a hot melt and thereafter cured by a thermally triggered novel curing agent to a thermoset adhesive, sealant or coating at a more elevated temperature. Other objects will become apparent from a reading hereinafter.

DESCRIPTION OF THE INVENTION

This invention is directed to latent thermal curing agents for epoxy resins comprising cyanourea compounds of the formula:

wherein R is the organic moiety of a mono- or polyisocyanate remaining after reaction of the isocyanate groups to form cyanourea groups and n is 1 or more, preferably 1 to 2. The epoxy-curing agent system is stable at room temperature and cures at temperatures above 100° C. to form a crosslinked, solid material suitable as an adhesive, sealant or coating. The cyanourea compound in polymeric form also can be dissolved in a solvent and admixed with an epoxy resin to form a thermoset adhesive, sealant or coating on heating above 100° C.

The monomeric cyanourea compound can be formed by reacting a mono- or polyisocyanate with cyanamide to form a cyanourea compound, e.g.,

  (1)

In reaction (1) supra the reactants are reacted in amounts ranging from stoichiometric up to a 5% molar excess of either reactant. The reaction is carried out under atmospheric conditions but can also be performed in an inert, e.g., nitrogen atmosphere, to avoid any reaction between the isocyanate groups and water in the atmosphere. The reaction is preferably carried out at room temperature. However, in some instances the cyanamide reactant is heated above its melting point, e.g., at about 50° C., mixed with the mono- or polyisocyanate and thereafter the reaction is run at room temperature.

Although the reaction is usually run in the absence of a solvent, organic solvents such as dioxane and toluene can be used if desired. The reaction can be run in aqueous medium also by dissolving cyanamide in a sodium hydroxide solution and isocyanate in an inert water soluble solvent such as n-methyl pyrrolidone, dioxane and 2-ethoxyethyl ether, i.e.,

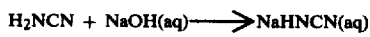

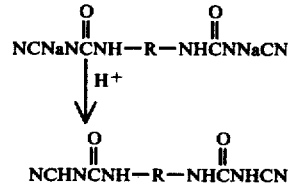

One method of determining completion of the reaction is to monitor the decrease in NCO content with IR. Acid or acid chloride stabilizers such as benzoyl chloride, p-toluene-sulfonic acid and p-toluenesulfonic chloride, are usually added to the reaction to avoid polymerization of the resultant monomer product.

The mono- and polyisocyanates employed in the instant invention to form the novel cyanourea compounds by reaction (1) can be aromatic, aliphatic, cycloaliphatic and combinations thereof. Preferred are the diisocyanates, but mono-, tri- and tetraisocyanates are also operable. Representative, but not limiting, of the monoisocyanates are phenyl isocyanate, chlorphenyl isocyanate, octadecyl isocyanate and cyclohexyl isocyanate. More specifically, illustrative of the diisocyanates are 2,4-toluene diisocyanate, m-phenylene diisocyanate, xylylene diisocyanate, 4-chloryl-1,3-phenylene diisocyanate, 4,4'-biphenylene diisocyanate, 1,4-tetramethylene and 1,6-hexamethylene diisocyanate, 1,4-cylcohexylene diisocyanate, 1,5-tetrahydronaphthalene diisocyanate methylene diphenyl diisocyanate and methylene dicyclohexyl diisocyanate. Diisocyanates in which each of the diisocyanate groups is directly attached to a ring are preferred since usually they react more rapidly.

Other diisocyanates which may be used are the high molecular weight diisocyanates obtained by reacting polyisocyanates with polyamines containing terminal primary or secondary amine groups or dihydric alcohols. For example: 2 moles of diisocyanate $R_5(NCO)_2$ are reacted with 1 mole of a diol $OH-R_6-OH$ to form a chain extended diisocyanate, i.e.,

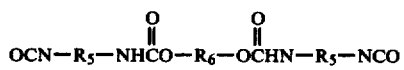

wherein $R_5$ and $R_6$ are divalent organic moieties. Thus, the alkane and alkene polyols such as 1,5-pentene diol, ethylene glycol, polyethylene glycol, propylene glycol, polypropylene glycol, "Bisphenol-A" and substituted "Bisphenol-A" are operable herein to chain-extend the diisocyanate reactant. These diols can have molecular weights ranging from about 200 up to about 20,000.

Additionally, unsaturated diisocyanates can also be employed. These materials, for example, can be formed from diols such as the family of hydroxyl terminated homopolymers and copolymers, commercially available from ARCO under the tradename "Poly bd" resins. Such resins include butadiene homopolymers of the formula:

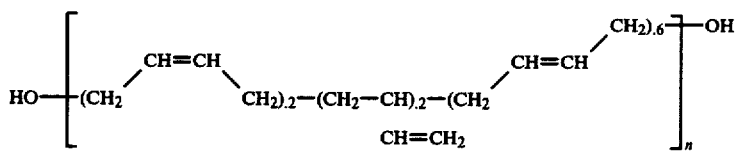

wherein n is about 50, and styrene-butadiene and acrylonitrile-butadiene copolymer diols of the formula:

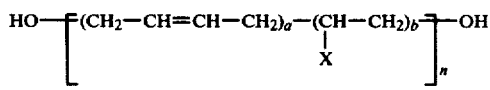

wherein

| X = O for styrene-butadiene copolymer | X = CN for acrylonitrile-butadiene copolymer |
|---|---|
| a = .75 | a = 0.85 |
| b = .25 | b = 0.15 |
| n = 54 | n = 78–87 |

One mole of these unsaturated polyols will react with two moles of a diisocyanate to form a chain-extended diisocyanate having unsaturation in the backbone thereof.

The novel cyanourea monomer compound of the instant invention is readily polymerized to a polymer having the recurring structural formula:

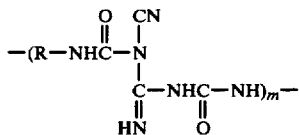

i.e., N,N'-biscarbamyl-N-cyanoguanidine units, connected together through the R group of the carbamyl moiety and m is greater than 2. R is the organic moiety of a polyisocyanate remaining after reaction of the isocyanate groups to form cyanourea groups. The polymerization is carried out in bulk or in an organic solvent at room temperature for periods ranging from 24 to 100 hours. Organic solvents operable herein for the polymerization reaction include, but are not limited to, N-methylpyrrolidone, N,N-dimethyl acetamide, N,N-dimethyl formamide and tetramethylene sulfoxide.

This polymer can also be prepared directly from the mixture of diisocyanate and cyanamide in a suitable solvent such as N-methyl pyrrolidone without preparing N-cyanourea intermediate, i.e.,

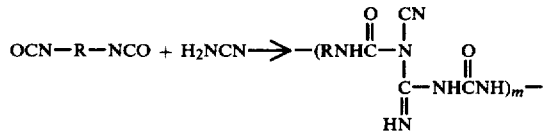

by carrying out the reaction at room temperature for 72 hours or more. Although no catalyst is necessary for the polymerization reaction, it has been found that triethylamine or water in catalytic amounts seem to give a faster reaction rate.

The preparation of the novel cyanourea compounds used herein as epoxy curing agents in both monomeric and polymeric form is set out in my copending application, having Ser. No. 331,951, filed Dec. 18, 1981, all incorporated herein by reference.

The epoxy resin used herein to form a cured thermoset material comprises those materials possessing at least one and preferably more than one epoxy group, i.e.,

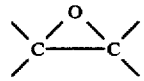

group. These compounds may be saturated or unsaturated, aliphatic, cycloaliphatic, aromatic or heterocyclic and may be substituted with substituents, such as chlorine hydroxyl groups, ether radicals and the like. They may be monomeric or polymeric.

For clarity, many of the polyepoxides and particularly those of the polymeric type are described in terms of epoxy equivalent values. The meaning of this expression is described in U.S. Pat. No. 2,633,458. That is, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 1, 2, 3, 4 and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like. The polyepoxides used in the present composition and process are those having an epoxy equivalency of at least 1.0.

Various examples of polyepoxides that may be used in the composition and process of this invention are given in U.S. Pat. No. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the composition and process of this invention include the epoxidized esters of unsaturated monohydric alcohols and polycarboxylic acids. For example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxy-dodecyl) maleate, di(2,3-epoxybutyl) tetraphthalate, di(2,3-epoxypentyl) thiodipropionate, di(5,6-epoxy-tetradecyl) diphenyldicarboxylate, di(3,4-epoxyheptyl) sulfonyldibutyrate, tri(2,3-epoxybutyl) 1,2,4-butane-tricarboxylate, di(5,6-epoxypentadecyl) tartarate, di(4,5-epoxytetradecyl) maleate, di(2,3-epoxybutyl)-azelate, di(3,4-epoxybutyl) citrate, di(5,6-epoxyoctyl) cyclohexane-1,2-dicarboxylate, di(4,5-epoxyoctadecyl) malonate.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline or di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether-A and Polyether-B described in the above-noted U.S. Pat. No. 2,633,458 are good examples of polyepoxides of this type. Other examples include the polyglycidyl ether of 1,1,2,2-tetrakis(4-hydroxyphenyl)-ethane (epoxy value of 0.45 eq./100 g) and melting point 85° C., polyglycidyl ether of 1,1,5,5-tretrakis(hydroxyphenyl)pentane (epoxy value of 0.514 eq./100 g) and the like and mixtures thereof.

Additional examples of epoxy resins operable herein include, but are not limited to, diglycidyl isophthalate, diglycidyl phthalate, o-glycidyl phenyl glycidyl ether, diglycidyl ether of resorcinol, triglycidyl ether of phloroglucinol, triglycidyl ether of methyl phloroglucinol, 2,6-(2,3-epoxypropyl)phenylglycidyl ether, [4-(2,3-epoxy)propoxy-N,N-bis(2,3-epoxypropyl)aniline, 2,2-bis[p-2,3-epoxypropoxy)phenyl]-propane, diglycidyl ether of bisphenol-A, diglycidyl ether of bisphenol-hexafluoroacetone, diglycidyl ether of 2,2-bis(4-hydroxyphenyl)nonadecane, diglycidyl phenyl ether, triglycidyl 4,4-bis(4-hydroxyphenyl)pentanoic acid, diglycidyl ether of tetrachlorobisphenol-A, diglycidyl ether of tetrabromobisphenol-A, triglycidyl ether of trihydroxybiphenyl, tetraglycidoxy biphenyl, [tetrakis(2,3-epoxypropoxy)diphenylmethane], [2,2',4,4'-tetrakis(2,3-epoxypropoxy)benzophenone, 3,9-bis[2-(2,3-epoxypropoxy)-phenylethyl]-2,4,8,10-tetraoxaspiro[5,5]undecane, triglycidoxy-1,1,3-triphenylpropane, tetraglycidoxy tetraphenylethane, polyglycidyl ether of phenolformaldehyde novolac, polyglycidyl ether of o-cresol-formaldehyde novolac, diglycidyl ether of butanediol, di(2-methyl)glycidyl ether of ethylene glycol, polyepichlorohydrin di(2,3-epoxy-propyl)ether, diglycidyl ether of polypropylene glycol, epoxidized polybuadiene, epoxidized soybean oil, triglycidyl ether of glycerol, triglycidyl ether of trimethylol-propane, polyallyl glycidyl ether, 2,4,6,8,10-pentakis-[3-(2,3-epoxypropoxy)-propyl]2,4,6,8,10-pentamethylcyclopentasiloxane, diglycidyl ether of chlorendic diol, diglycidyl ether of dioxanediol, diglycidyl ether of endomethylene cyclohexanediol, diglycidyl ether of hydrogenated bisphenol-A, vinylcyclohexene dioxide, limonene dioxide, dicyclopentadiene dioxide, p-epoxycyclopentenylphenyl glycidyl ether, epoxydicyclopentenylphenyl glycidyl ether, o-epoxycyclopentenylphenylglycidyl ether, bis-epoxydicyclopentyl ether of ethylene glycol, [2-3,4-epoxy)-cyclohexyl-5,5-spiro(3,4-epoxy)-cyclohexane-m-dioxane], 1,3-bis[3-(2,3-epoxypropoxy)propyl]tetramethyldisiloxane, epoxidized polybutadiene, triglycidyl ester of linoleic trimer acid, epoxidized soybean oil, diglycidyl ester of linoleic dimer acid, 2,2-bis[4-(2,3-epoxypropyl)cyclohexyl]propane, 2,2-(4-[3-chloro-2-(2,3-epoxypropoxy)-propolyl]-cyclohexyl)propane, 2,2-bis(3,4-epoxycyclohexyl)propane, bis(2,3-epoxycyclopentyl)ether(liquid isomer), bis(2,3-epoxycyclopentyl)ether(solid isomer), 1,2-epoxy-6-(2,3-epoxypropoxy)hexahydro-4,7-methanoindane, 3,4-epoxycyclohexylmethyl-(3,4-epoxy)cyclohexane carboxylate, 3,4-epoxy-6-methylcyclohexylmethyl-4-epoxy-6-methylcyclohexane carboxylate and bis(3,4-epoxy-6-methylcyclohexylmethyl)adipate. Tri- and tetrafunctional epoxides such as triglycidyl isocyanurate and tetraphenylolethane epoxy are also operable herein.

The equivalent ratio of epoxide to N-cyanourea can vary between wide limits. Operable herein is an equivalent ratio of epoxide:N-cyanourea of 1 to 30:2 which results in a thermoset material on heating. Furthermore, in order to obtain a thermoset material, there has to be at least 1 cyanourea group present.

The epoxy-curing agent system can be prepared in three different ways, to wit:

(1) The cyanourea compound in monomeric form can be admixed to afford a pumpable, high solid 100% reactive material which on heating to temperature above 100° C. forms a crosslinked material.

(2) The monomeric cyanourea compound can be admixed with the epoxy resin at room temperature, allowed to stand for an extended period, e.g., a week, at which time the monomeric material converts to a polymer resulting in a solid dry film adhesive or reactive hot melt adhesive. This material on heating above 100° C. also results in a crosslinked adhesive sealant on heating.

(3) The epoxy can also be admixed with the curing agent in polymeric form in the presence of a solvent, e.g., acetone, and applied as a solvent based coating. Upon heating above 100° C. the solvent is driven off and a crosslinked coating results.

The following examples will aid in explaining, but expressly not limit, the instant invention. Unless otherwise noted, all parts or percentages are by weight.

The lap shear strength of the adhesives was measured on an Instron Tensile Tester using the method set out in ASTM D-1002.

EXAMPLE 1

Preparation of Diisocyanate Adduct 76 g of polypropylene glycol (MW=725 g/mole) were added dropwise over a 6-hour period to a flask containing 50 g of toluene diisocyanate in a nitrogen atmosphere. The reaction was continued with stirring for 6 hours at room temperature. The resultant chain-extended, isocyanate-terminated product will hereinafter be referred to as diisocyanate adduct (A).

EXAMPLE 2

126 g of diisocyanate adduct (A) from Example 1 were heated to 50° C. and mixed with 12 g of cyanamide and 0.8 g of benzoyl chloride as a stabilizer. The reaction was cooled to room temperature and continued with stirring for 3 hours. The IR spectrum of the resultant viscous liquid cyanourea product, i.e.,

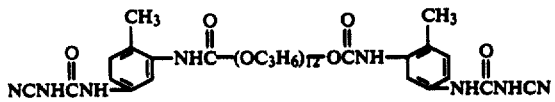

showed the disappearance of —NCO (2340 cm$^{-1}$) and a strong absorption at 2270 cm$^{-1}$ (—C≡N). This product will hereinafter be referred to as curing agent (A).

EXAMPLE 3

To 10 g of an epoxy resin commercially available from Shell Chemical Co. under the tradename "Epon-828" was added 2.5 g of curing agent (A) from Example 2. The admixture was allowed to stand at room temperature for 2 months at which time it was determined that the admixture was chemically and physically stable. A portion of the stable admixture was then cured by heating at 100° C. for one hour followed by heating at 155° C. for 2 hours. The resultant thermoset product was hard and had good impact resistance.

Another portion of the stable admixture was coated on an aluminum substrate and cured by heating at 100° C. for 1 hour followed by a heating at 150° C. for 2 hours. The cured thermoset coating had excellent adhesion to the aluminum substrate.

EXAMPLE 4

12.6 g of diisocyanate adduct (A) from Example 1 were heated to 50° C. and mixed with 12 g of cyanamide. The reaction mixture was cooled to room temperature and allowed to stand for 30 days resulting in a polymeric product as shown by the shift of cyano group absorption from 2270 cm$^{-1}$ to 2180 cm$^{-1}$ in an IR spectrum. The polymer was dissolved in acetone and mixed with 55.2 g of "Epon-828". The solution was coated on an aluminum substrate, dried in air and cured by heating at 170° C. for 2 hours. The cured coating had excellent adhesion to the aluminum substrate.

EXAMPLE 5

100 g of polycaprolactone diol, i.e., PCP-200, commercially available from Union Carbide, having a molecular weight of 530 g/mole, was added dropwise to 65.7 g of toluene diisocyanate in a nitrogen atmosphere over a 4-hour period. Stirring of the thus formed isocyanate terminated adduct was continued overnight. After heating up to 50° C., 15.8 g of cyanamide was added to the mixture. As soon as the mixture was homoegeneous, it was cooled to room temperature. After stirring for 2 hours, several batches were made up to which varying amounts of "Epon-828" were added. The compositions of epoxy-curing agent system (equivalent number of epoxide/equivalent number of N-cyanourea) and their adhesion properties after curing for 1 hour at 100° C. followed by a 2-hour cure at 160° C. on ⅛ in.² overlapped substrates of steel, aluminum and SMC are shown in FIG. 1.

EXAMPLE 6

Portions of the epoxy-curing agent mixtures from Example 5 after aging for 2 weeks changed from the original pumpable liquid to a sticky hot melt adhesive. The IR indicated that the epoxide absorption was independent of the aging at room temperature and the absorption of cyano group shifted from 2270 cm$^{-1}$ to 2180 cm$^{-1}$. After heating at 170° C. for 2 hours, the mixtures showed the disappearance of both, cyano and epoxide groups. The adhesion properties of the aged mixtures on the same adherends and the same curing conditions were as good as the fresh mixtures used in Example 5.

The components of the curable compositions herein, prior to curing, may be admixed with or blended with other monomeric and polymeric materials such as thermoplastic resins, elastomers or thermosetting resin monomeric or polymeric compositions. The resulting blend may be subjected to conditions for curing or cocuring of the various components of the blend to give cured products having unusual physical properties.

The compositions to be cured in accord with the present invention may also, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the epoxy or curing agent prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 200 parts or more per 100 parts of the epoxy-curing agent composition by weight and preferably about 0.005 to about 100 parts on the same basis.

In practicing the instant invention in order to obtain a cured thermoset solid adhesive, sealant or coating, it is necessary to heat the composition above room temperature. Heating the composition at a temperature in the range 100° to 250° C. is sufficient to obtain the thermoset material.

It is also possible in practicing the instant invention to set up the composition as a two-component system. That is, the epoxy resin can be admixed with the mono- or polyisocyanate at temperatures ranging from 0°–80° C. in the absence of a catalyst to form one component, the other component being cyanamide. Thereafter, the two components can be admixed immediately prior to use. Although the exotherm from the reaction between the isocyanate and the cyanamide is sometimes sufficient to form a cured, thermoset, epoxy-containing product, the addition of heat to the system to bring the temperature in the range 100°–250° C. insures a thermoset product.

What is claimed is:

1. A heat curable composition comprising an epoxy resin and a cyanourea compound of the formula:

wherein R is the organic moiety of a mono- or polyisocyanate remaining after reaction of the isocyanate groups to form cyanourea groups and n is 1 or more, the equivalent ratio of epoxide:N-cyanourea being 1 to 30:2.

2. A heat curable composition comprising
  (1) an epoxy resin, and
  (2) a polymer having the following recurring structural units:

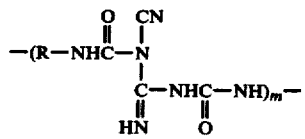

wherein R is the organic moiety of a polyisocyanate remaining after reaction of the isocyanate groups to form cyanourea groups and m is at least 2, the equivalent ratio of epoxide:N-cyanourea being 1 to 30:2.

3. The composition of claim 1 also containing a solvent for the composition.

4. The composition of claim 2 also containing a solvent for the composition.

5. A process for forming a thermoset material which comprises heating an epoxy resin and a cyanourea compound of the formula:

wherein R is the organic moiety of a mono- or polyisocyanate remaining after reaction of the isocyanate groups to form cyanourea groups and n is 1 or more at a temperature above 100° C., the equivalent ratio of epoxide:N-cyanourea being 1 to 30:2.

6. A process for forming a thermoset material which comprises heating an epoxy resin and a polymer having the following recurring structural units:

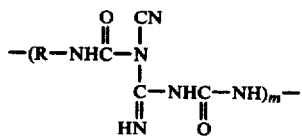

wherein R is the organic moiety of a polyisocyanate remaining after reaction of the isocyanate groups to form cyanourea groups and m is at least 2 at a temperature above 100° C., the equivalent ratio of epoxide:N-cyanourea being 1 to 30:2.

7. The process according to claim 5 wherein the composition also contains a solvent.

8. The process according to claim 6 wherein the composition also contains a solvent.

9. The composition of claim 1 as an adhesive.
10. The composition of claim 1 as a sealant.
11. The composition of claim 1 as a coating.
12. The composition of claim 2 as an adhesive.
13. The composition of claim 2 as a sealant.
14. The composition of claim 2 as a coating.

15. The process of adhering two substrates which comprises applying to at least one of said substrates a heat curable composition comprising an epoxy resin and a cyanourea compound of the formula:

wherein R is the organic moiety of a mono- or polyisocyanate remaining after reaction of the isocyanate groups to form cyanourea groups and n is 1 or more, the equivalent ratio of epoxide:N-cyanourea being 1 to 30:2 contacting the substrates with the composition therebetween and heating the thus contacted substrates at a temperature above 100° C.

16. The process of adhering two substrates which comprises applying to at least one of said substrates a heat curable composition comprising (1) an epoxy resin, and
(2) a polymer having the following recurring structural units:

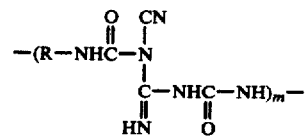

wherein R is the organic moiety of a polyisocyanate remaining after reaction of the isocyanate groups to form cyanourea groups and m is at least 2, the equivalent ratio of epoxide:N-cyanourea being 1 to 30:2 contacting the substrates with the composition therebetween and heating the thus contacted substrates at a temperature above 100° C.

17. The process according to claim 15 wherein the composition contains a solvent.

18. The process according to claim 16 wherein the composition contains a solvent.

* * * * *